United States Patent [19]
Heidemeyer et al.

[11] Patent Number: 6,042,260
[45] Date of Patent: Mar. 28, 2000

[54] METHOD OF CARRYING OUT CONTINUOUS PREPARATION PROCESSES ON TIGHTLY MESHING EXTRUDERS ROTATING IN THE SAME SENSE

[75] Inventors: Peter Heidemeyer; Erwin Häring, both of Stuttgart; Rainer Münz, Murrhardt; Rainer Herter, Ditzingen; Ulrich Burkhardt, Stuttgart, all of Germany

[73] Assignee: Krupp Werner & Pfleiderer GmbH, Germany

[21] Appl. No.: 09/043,954
[22] PCT Filed: Aug. 9, 1996
[86] PCT No.: PCT/EP96/03531
§ 371 Date: Mar. 27, 1998
§ 102(e) Date: Mar. 27, 1998
[87] PCT Pub. No.: WO97/12746
PCT Pub. Date: Apr. 10, 1997

[30] Foreign Application Priority Data

Sep. 29, 1995 [DE] Germany .......................... 195 36 289

[51] Int. Cl.⁷ ............................. B29C 47/40; B29C 45/76
[52] U.S. Cl. .............................................. 366/83; 366/100
[58] Field of Search .................................. 366/83, 84, 85, 366/100, 297, 300, 301

[56] References Cited

U.S. PATENT DOCUMENTS

| | | |
|---|---|---|
| 4,113,822 | 9/1978 | Takiura et al. .............................. 366/85 |
| 4,162,854 | 7/1979 | Ullrigh ...................................... 366/83 |
| 4,707,139 | 11/1987 | Valenzky et al. ........................... 366/77 |

FOREIGN PATENT DOCUMENTS 33 48 324   11/1993   Germany .
WO 92/17522   of 1992   WIPO .

OTHER PUBLICATIONS

VDI–Gesellschaft Kunstsofftechnik, Der Doppelschneckenextruder Grundlagen und Anwendungsgebiete. pp. 154–177, Apr. 1994.

Kunststofftechnik, Der Doppelschneckenextruder–Grundlagen–und Anwendungsgebiete, p. 235–255, no date avaliable.

Integrating Compounding and Reacting with Finished Products Extrusion, p. 1–10, Styrenics RETEC, Feb. 27–28, 1995, Dallas, Texas.

Leistritz Extrusionstechnik, Anlage 4, pp 1–19, Brochure.

Leistritz Extrusionstechnik, Anlage 5 (with English), 9 pages, Brochure.

Leistritz Extrusionstechnik, Die neue Star–Compounder–Baureihe . . . Anlage 6, 5 pages, Brochure.

Technische Daten, Zweiwelliger Schneckenkneter ZSK, Anlage 7, 1 page.

Kunststofftechnik—Technische Daten ZSK, Anlage 8, 1 page.

Werner & Pfleiderer, Technische Daten ZSK, Anlage 9, 1 page.

Kunstsoffe—ein Werkstoff macht Karriere, pp V–XIII (partial translation), Copyright 1985.

(List continued on next page.)

Primary Examiner—Tony G. Soohoo
Attorney, Agent, or Firm—Robert F I Conte; Lee, Mann, Smith, McWilliams, Sweeney, & Ohlson

[57] ABSTRACT

In a method of carrying out continuous preparation processes on tightly meshing extruders rotating in the same sense such as twin-screw and multi-shaft screw-type extruders, the extruder is operated at a screw speed of rotation of at least 800 rpm, accompanied with a simultaneous increase of the so-called "torque density" ($M_d/a^3$) of at least 11 Nm/cm³ and a volumetric ratio (Da/Di) of at least 1.5.

8 Claims, 4 Drawing Sheets

OTHER PUBLICATIONS

Auf dem Weg zur flexiblen und intelligenten Aufbereitungsanlage.pp 876–884 (partial translation).

The Theysohn Compounder, Anlage Nr. 5, Akte/Az, 38697, PA Dr. Stoffregen, 5 pages, Brochure.

Der Compounder TSK, Anlage Nr 7, Akte/Az 38697, PA Dr. Stoffregen, Brochure.

Evaluating Extrusion Models for Scale–up the Twin–Screw Compounding Process, Martin H. Mack, Berstorff Corporation, Charlotte, NC, Aug. 1995, Compounding '95 Conference, 14 pages.

Handbuch der Kunststoff–Extrusionstechnik II, Herausgegeben von Prof. Dr. F. Hensen, pp. 8–12, 19, 20, 28–31, 374–377, Copyright 1986.

Berstorff K–96 Exhibit, Jul. 26, 1996, 1 page.

Berstorff K'95 Press Release, pp. 1 and 2, Oct. 1995.

Der Compounder TSK, Anlage Nr. 8, Akte/Az 38697, PA Dr. Stoffregen, 3 pages, Brochure.

Preliminary Examination—PCT/EP96/03531, with English Translation.

International Search Report—PCT/ EP96/03531.

Japan Plastics, Jan. 1975, Fumio Aida: Investigation of Ultra–High Speed Extruder Based on Entirely New Design Concept.

Plastics Engineering, Apr. 1979, George A. Kruder and R. E. Ridenour: "New concepts spur development of ultra–high–speed extrusion".

Kunststoffe, Apr. 1962, E. Beck: Betriebsverhalten und Praxisergebnisse von schnellaufenden Schneckenpressen.

The Plasticating Extruder: Introduction to Plasticating Extrusion.

METHOD OF CARRYING OUT CONTINUOUS PREPARATION PROCESSES ON TIGHTLY MESHING EXTRUDERS ROTATING IN THE SAME SENSE

The invention relates to a method of carrying out continuous preparation processes on tightly meshing extruders rotating in the same sense such as twin-screw and multi-shaft screw-type extruders.

Tightly meshing twin-screw and multi-shaft screw-type extruders rotating in the same direction are used for continuous kneading processes with or without melting. Frequently, continuous degassing, mixing and expanding processes are integrated, too, and there are cases when the extruders are also used for reactions.

The products to be processed comprise plastics, resins, liquids, viscoplastic fluids, pulverulent and fibrous additives as well as food compounds. Discharging may take place for instance via filters and molding processes such as pelletization and section extruding.

Extruders of the type mentioned at the outset have been known, in which the screw diameter amounts to as much as 340 mm. The throughputs range from 5,000 to 35,000 kg/h at a ratio between the screw outer diameter and screw inner diameter ($D_a/D_i$) of 1.18 to 1.25 and 1.4 to 1.6, respectively. The ratio between torque and center distance$^3$ of axes ($m_d/a^3$)—the so-called "torque density"—is in the range of 5 to 10. Depending on the size of the extruders, speeds of rotation are run, ranging from 200 to 500 rpm—in exceptional cases even up to 600 rpm.

Customarily, the design of the extruders is based on the principle of geometric and torque related similarity. Geometric similarity exists when the ratio $D_a/D_i$ is constant; torque related similarity exists when the ratio $M_d/a^3$ is constant.

In addition to melt temperature and dwell time, the shear rate within the screw root filled with melt is another decisive factor for the dispersing, mixing and homogenization grade of the processed product.

In many processes the mixing, dispersing and homogenization grade will be the higher, the higher the shear rate. In today's state of extruder engineering, mean shear rates in the melting range of between 20 to 150 l/sec and mean product dwell times in the entire screw range of between 15 to 60 sec are customary in standard preparation processes.

In conventional extruders, the mean shear rates are restricted upwards by the screw speed of rotation and the so-called "volumetric ratio" represented by the ratio $D_a/D_i$. However, increasing shear rates are accompanied with higher specific values of the energy supplied, which may lead to inacceptably high melt temperatures. Together with high average dwell times of the product in the extruder, this may lead to quality reducing deterioration of the product in terms of thermal decomposition and cross-linking.

It is the object of the invention to put into practice quality increasing mean shear rates in the range of up to $\geq 1,000$ l/sec accompanied with simultaneous reduction of the duration of action of temperature peaks in the product without possible occurrence of the difficulties described above.

This object is attained by the extruder being operated at a screw speed of rotation of at least 800 rpm while the so-called "torque density" ($M_d/a^3$) which can be induced is simultaneously increased by at least 11 Nm/cm$^3$ and the volumetric ratio ($D_a/D_i$) is at least 1.5.

With the increased torque density ($M_d/a^3$) selected according to the invention of at least 11 Nm/cm$^3$, the extruder can easily be operated at the high screw speeds of rotation without any inadmissibly high specific energy input resulting. Another advantage resides in a very high product throughput per time unit.

Suitably, the dwell time of the product in the extruder is less than 10 seconds.

In keeping with another embodiment of the invention, the extruder is operated at a screw speed of rotation of up to 3,000 rpm, while the so-called "torque density" ($M_d/a^3$) that can be induced is increased by up to 15 Nm/cm$^3$ and the volume ratio is greater than or equal to 1.55 and the mean product dwell time is less than 2 seconds. This will give especially short (mean) dwell times of the product in the extruder as a result of the high throughputs then possible.

The short product dwell times of 1 to 10 sec resulting from the high screw speeds of rotation and the high product throughputs simultaneously reduce the tendency toward thermal decomposition or cross-linking of the products.

Within certain limits, an increase of the screw speed of rotation is also possible without an increase of the torque density ($M_d/a^3$). However, the maximum screw speed of rotation is limited by the maximum upper limit of specific energy input which exists in every process and corresponds to the maximally permissible melt temperature (without deterioration of the product occurring).

The embodiment according to the invention of the method of the type mentioned at the outset helps open further fields of use.

For instance, the method according to the invention can be used for the continuous masterbatching in the solids conveying range and for the grinding into powder of coarse-grained bulk material. Also, a combination of the two processes mentioned above is conceivable, i.e. a homogenization process of solids, which requires clearly less energy as compared with homogenization in the plastic phase.

Using the method according to the invention in reaction machines will moreover ensure efficient masterbatching of monomers and catalyst prior to the reaction in the incubation period.

Another advantage of the method according to the invention resides in that for instance pigments can be dispersed distinctly better during masterbatching.

In the following, the invention will be explained, based on diagrammatic illustration and drawings, in which.

Tests based on the method according to the invention were made on commercial two-shaft screw-type machines (two-shaft screw kneaders having tightly meshing screw shafts rotating in the same direction), the structure of the machine (screw geometry, mixing and kneading elements) being left as used so far for the respective plastics preparation process at customary speeds of rotation of 200 to 400 rpm. Details of these commercial machines will be explained below, based on FIGS. 3 to 5.

In the tests, use was made of screw speeds of rotation by far exceeding 1000 rpm, and surprisingly it was found that upon simultaneous increase of the induced torque density to 11 to 14 Nm/cm$^3$, no substantial increase of material temperature occurred. Even with an increase of the material temperature (for instance PC>350° C.) to some unusually high melt temperature, there is no deterioration of the product, since the dwell times in the extruder are by far less than 10 s due to the method according to the invention.

Figure 1:
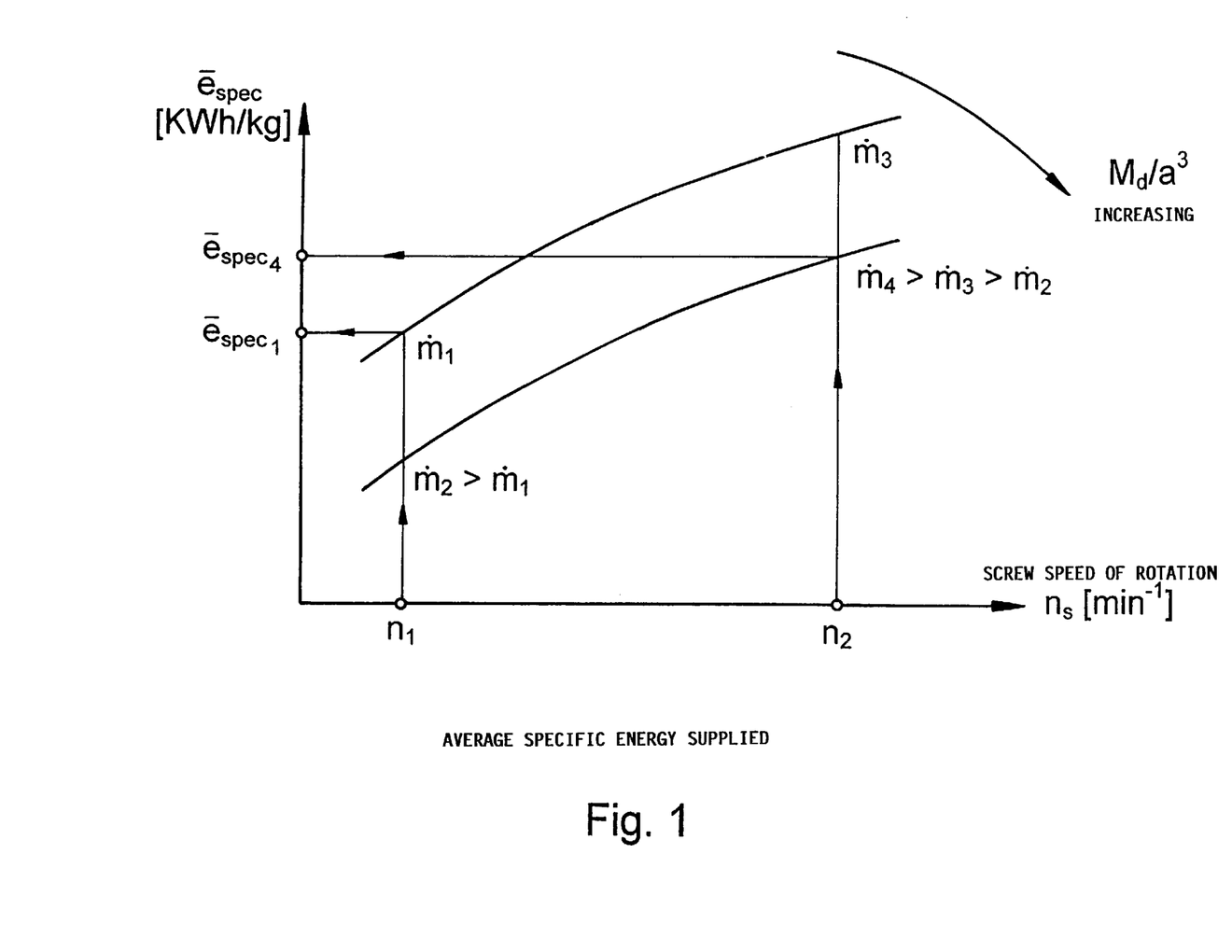
FIG. 1 is a representation of the "mean specific energy input"

FIG. 1 diagrammatically illustrates the context between the screw speed of rotation (shear rate) and the specific energy supplied for varying torque densities $Md/a^3$. Under the condition that the available torque is utilized, higher throughputs result while torque density increases (at a constant speed of rotation). Noticeably, reduced energy inputs and thus lower melt temperatures result from an increased torque density. On the other hand, an increase of the screw speed of rotation will generally lead also to increased material throughput, however, at a given torque density, this throughput is connected with an increased energy input.

Figure 2:
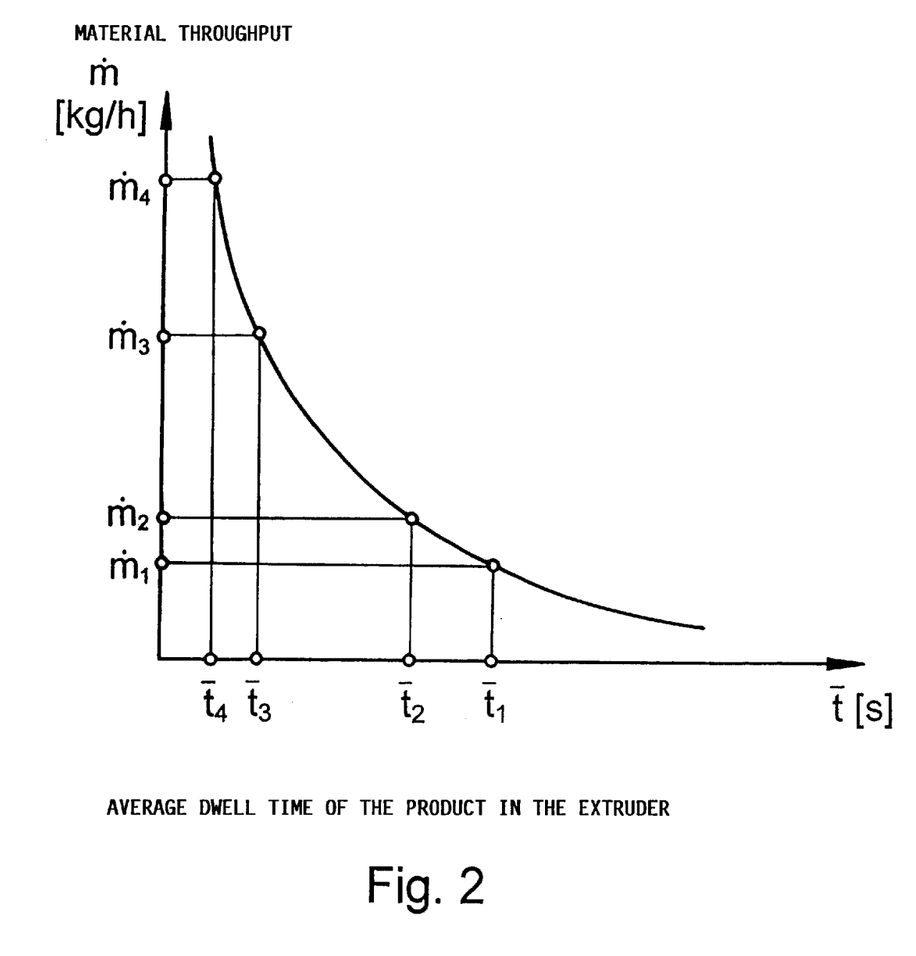
FIG. 2 is a representation of the "material throughput and mean dwell time of the product in the extruder".

FIG. 2 illustrates the dependency of throughput and dwell time. It shows that while the throughput increases, the time during which the material is exposed to high temperatures is clearly reduced.

Tests carried out have shown that even a material temperature which, from experience so far, simply had to lead to reduced quality in the product will not mean quality impairment if the time of exposure is sufficiently short. However, sufficiently short dwell times can only be obtained by increased throughputs which, again, can only be realized by an increase of the possible torque, since otherwise, at a given (high) speed of rotation, the driving power of the machine will no longer be sufficient.

As can also be seen in FIG. 1, an increase of the speed of rotation within certain limits is possible even without an increase of the torque density. The maximum upper limit, adherent to every method, of specific energy input ($e_{specmax}$ corresponds to the maximally permissible melt temperature without deterioration of the product at a given dwell time) restricts this speed of rotation.

As a rule, today's machines exhibit $D_a/D_i$ values ranging from 1.4 to 1.6 and $Md/a^3$ values between 5 and 10. Depending on the layout, the operating speeds of rotation range from 200 to 500 rpm, even to 600 rpm in exceptional cases.

The throughput and the quality of the compounded product depend on the screw geometry utilized, on the speed of rotation and the maximum torque of the machine.

It is the object of every compounding job to obtain a homogenous final product—as a rule by incorporation of additives. The additives and any existing inhomogeneities must be dispersed in the machine and incorporated distributively. Dispersing particles requires more or less elevated shear stresses, which have to be imparted to the particles by way of the surrounding matrix. According to the equation $$\tau = \eta * \bar{Y} \qquad (1)$$

the shear stress $\tau$ results from the viscosity $\eta$ of the matrix medium and the shear rate $\bar{Y}$ there forced on. Therefore, in addition to the melt temperature and the dwell time, the shear rate $\bar{Y}$ [1/sec] is a decisive factor for the dispersing, mixing and homogenization grade of the processed product in the screw root filled with melt.

In a simplified consideration of the shear rate as a mean value from the quotient circumferential screw speed/spiral depth, the following applies (provided a 100% degree of filling in the screw root):

$$\bar{Y} = \frac{v_u}{\bar{h}} = \frac{D_a * \pi * n_s}{(D_a - D_i)/2} \qquad (2)$$

or $$\bar{Y} = 2\pi * n_s * \frac{(D_a/D_i)}{(D_a/D_i) - 1}$$

The following is true for many processes:

The higher the shear rate, the higher the mixing, dispersing and homogenization grade. With today's state of extruder engineering, mean shear rates in the melt range of 20 l/s to 150 l/s and mean dwell times of the product in the entire screw range of 15 to 60 s are customary in standard preparation processes.

In conventional extruders, the mean shear rates are restricted upwards by the screw speed of rotation and the "volumetric ratio" designated by $D_a/D_i$ as seen from the equation (2).

However, according to the equation and $$\bar{e}_{spec} = \frac{1}{\rho_s} * \bar{\eta}_{(\dot{Y})} * \bar{Y}^2 * \bar{t} \qquad (3)$$

and $$\bar{e}_{spec} = \frac{1}{\rho_s} * \bar{\eta}_{(\dot{Y})} * \bar{t} * 4\pi^2 * n_s * \left[\frac{(D_a/D_i)}{(D_a/D_i) - 1}\right]^2$$

higher values of specific energy input $e_{spec}$ will result in the case of increasing shear rates, which again may lead to inacceptably high melt temperatures, since the temperature increase of the melt is computed from the equation $\Delta T = e_{spec}/C_p$ ($C_p$=specific heat capacity). Combined with high average dwell times of the product in the extruder, a high shear rate may also lead to quality reducing deterioration of the product (thermal decomposition or cross-linking).

In twin-screw extruders rotating in the same sense and having screw speeds of rotation in the range of 600 to 3000 rpm accompanied with the increase of the induced torque density to 11 To 15 $Nm/cm^3$, quality increasing mean shear rates of up to 1000 l/s and simultaneous reduction of the duration of action of temperature peaks in the product can be realized by the method according to the invention.

Figure 3:
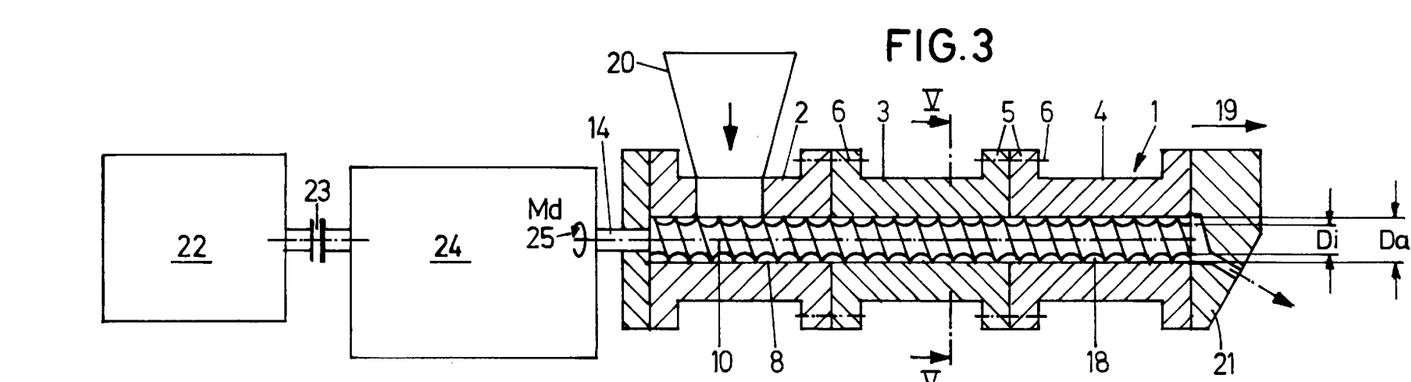
FIG. 3 is a vertical cut over the length of an extruder.
Figure 4:
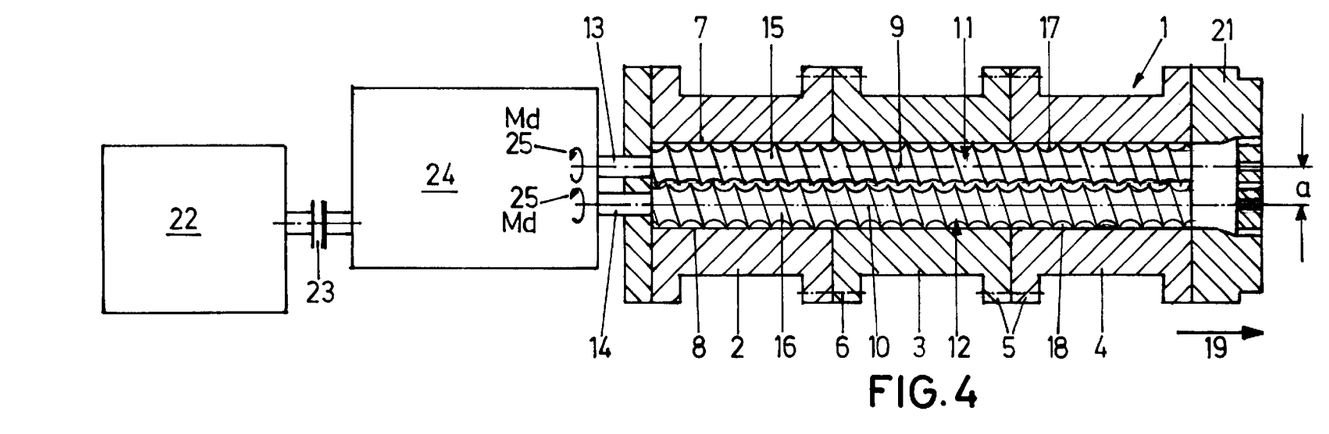
FIG. 4 is a horizontal cut over the length of the extruder.
Figure 5:
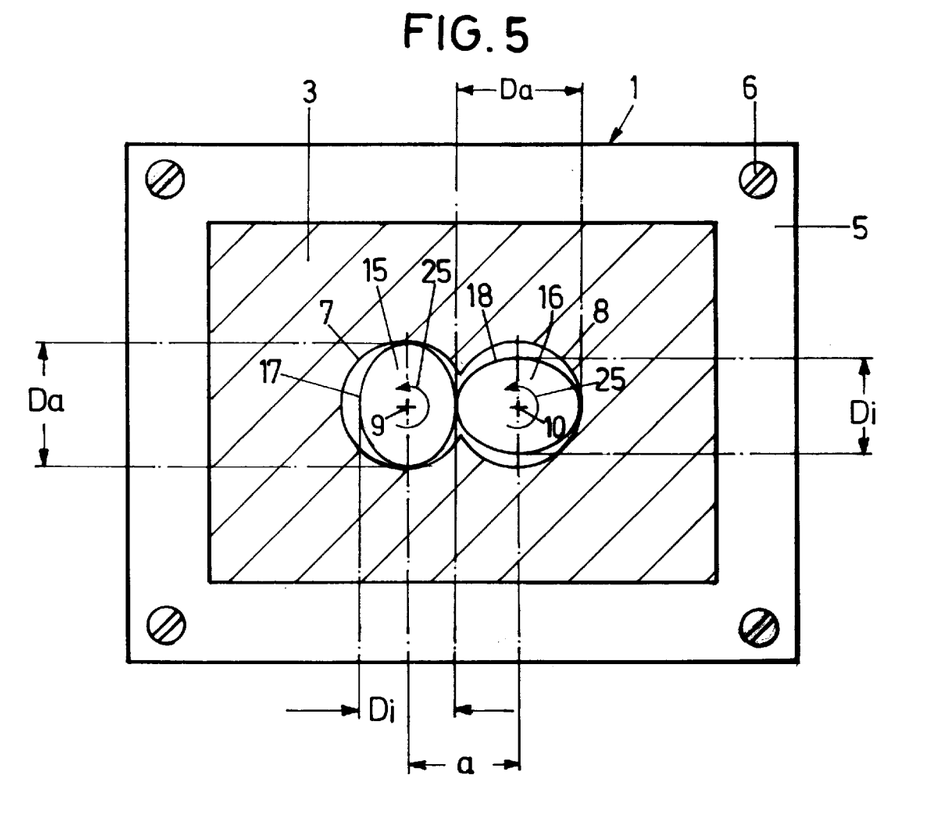
FIG. 5 is a cross-section through the extruder along the line V—V of FIG. 3.

The twin-screw extruders used for the tests specified above will become apparent from the diagrammatic illustration of FIGS. 3 to 5. The housing 1 of the extruder comprises several housing sections 2, 3, 4, which have flanges 5 by which they are detachably joined to each other by means of screws 6. The housing 1 comprises two cylindrical housing bores 7, 8 which are parallel to each other, intersect each other and have axes 9, 10 parallel to each other. Screw shafts 11, 12 are disposed in the housing bores 7, 8, each having a shaft 13, 14 which constitutes the core of the respective screw shaft 11 and 12, respectively, and a screw 15, 16 which is disposed on the core, spiralling in the form of a thread. On each screw shaft 11, 12, a screw root 17, 18 is defined by each screw 15, 16, by the shaft 13, 13 and the housing bore 7, 8. There is only a small gap between the screw 15, 16 and the respective housing bore 7, 8.

As seen in FIG. 4, the two screws 15, 16 rotate in the same direction. As seen in FIGS. 4 and 5, the screws 15, 16 mesh, i.e. the screw 16 of the screw shaft 12 engages with the screw root 17 of the screw shaft 11 and vice versa.

An inlet hopper 20, through which the materials to be processed are supplied, is formed on the housing section 2 which is disposed downstream, related to a direction of conveying 19. Outlet tools, namely die heads 21 such as pelletizing dies, die plates and the like may be attached to the housing section 4 which is disposed downstream, seen in the direction of conveying 10.

The screw shafts 11, 12 are each driven in the same direction of rotation 25 by a motor 22 via a clutch 23 and a reduction and distribution gear 24. Each shaft 13 and 14, respectively, can be driven by a torque $M_d$. The distance a of the axes 9, 10, the outer diameter $D_a$ of each screw 15 and 16, respectively, and the screw inner diameter $D_i$ are likewise seen in the drawing. $D_a$ and $D_i$ are identical for both screw shafts 11, 12.

Symbols used:
$\bar{e}_{spec}$ mean specific energy supplied [kWh/kg]
$\bar{t}$ mean dwell time of the product in the extruder [s]
$\rho$ melt density [kg/m$^3$]
$\bar{\gamma}$ mean shear rate [1/sec]
$\bar{\eta}$ mean dynamic viscosity [Pa sec]
$D_a$ screw outer diameter [mm]
$D_i$ screw inner diameter [mm]
$\bar{h}$ spiral depth, mean value
$n_s$ screw speed of rotation [min$^{-1}$] ([s$^{-1}$])
$m_d$ shaft torque, related to 1 shaft [Nm]
a center distance of axes of the screw shafts [cm]
$v_u$ circumferential speed of the screw shafts [m/s]
$M_{d/a^3}$ torque density, related to 1 shaft [nm/cm$^3$]
$\tau$ shear stress [Nm/mm$^2$]
$c_p$ specific enthalpy [kJ/kg*K]
m material throughput [kg/h]
$\Delta T$ material temperature increase [K]

We claim:

1. A method of carrying out a continuous process of preparation of plastic material on an extruder, comprising
   a housing,
   at least two cylindrical housing bores, each housing bore having an axis, said axes being disposed parallel to each other, said housing bores intersecting each other and having a first end and a second end,
   an inlet hopper being provided in the vicinity of said housing bores and opening into said housing bores,
   a die head being disposed at said second end of said housing bores,
   at least a first screw shaft and a second screw shaft being disposed in said at least first and second housing bores,
   said at least first and second screw shaft being provided with a first screw and a second screw, respectively, each screw defining a screw root, said first screw and said second screw root tightly intermeshing and said second screw and said first screw root tightly intermeshing,
   said first and said second screw each having a screw outer diameter $D_a$ and a screw inner diameter $D_i$, said screw diameters being identical,
   said at least first and second screw shaft each having a volumetric ratio of at least 1.5, wherein the volumetric ratio is defined by the screw outer diameter $D_a$ divided by the screw inner diameter $D_i$, and
   said first and said second axis having a distance a of axes,
   a drive connectable to said at least first and second screw shaft to drive said at least first and second screw shaft in a same direction of rotation at a screw speed of rotation $n_s$ and at a shaft torque $M_d$,
   wherein the method comprises the following steps:
      feeding plastic material to be processed through the inlet hopper into said housing bores,
      conveying said plastic material through said screw roots from said inlet hopper to said outlet,
      driving each of said at least first and said second screw shaft at a screw speed of rotation $n_s$ of at least 600 rpm, at a torque density $M_{d/a^3}$ of at least 11 Nm/cm$^3$,
      wherein the torque densitiy is defined by the shaft torque Ma [Nm] at each first and second shaft divided by the third power of the distance a of the first and second axes of the first and second screw shaft.

2. A method according to claim 1, wherein said at least first and second screw shaft is driven at a screw speed of rotation $n_s$ of at least 800 rpm.

3. A method according to claim 1, wherein the at least first and second screw shaft is driven at a screw speed of rotation $n_s$ of up to 3000 rpm.

4. A method according to claim 1, wherein said at least first and second screw shaft is driven at a torque density $M_d/a^3$ of up to 15 Nm/cm$^3$.

5. A method according to claim 1, wherein the plastic material is conveyed through said housing bores from said inlet hopper to said outlet at a mean product dwell time of less than 10 seconds.

6. A method according to claim 5, wherein the plastic material is conveyed through said housing bores from said inlet hopper to said outlet at a mean product dwell time of less than 2 seconds.

7. A method according to claim 1, wherein in addition to plastic material, pigments are fed into said housing bores.

8. A method according to claim 1, wherein said method is exercised on an extruder having a volumetric ratio of at least 1.55.

* * * * *

(12) EX PARTE REEXAMINATION CERTIFICATE (5654th)

United States Patent
Heidemeyer et al.

(10) Number: US 6,042,260 C1
(45) Certificate Issued: Jan. 16, 2007

(54) METHOD OF CARRYING OUT CONTINUOUS PREPARATION PROCESSES ON TIGHTLY MESHING EXTRUDERS ROTATING IN THE SAME SENSE

(75) Inventors: Peter Heidemeyer, Stuttgart (DE); Erwin Häring, Stuttgart (DE); Rainer Münz, Murrhardt (DE); Rainer Herter, Ditzingen (DE); Ulrich Burkhardt, Stuttgart (DE)

(73) Assignee: Dionysos Achtundachtzigste GmbH & Theodorestrasse 10, Stuttgart (DE)

Reexamination Request:
No. 90/007,709, Sep. 6, 2005

Reexamination Certificate for:
Patent No.: 6,042,260
Issued: Mar. 28, 2000
Appl. No.: 09/043,954
Filed: Mar. 27, 1998

(22) PCT Filed: Aug. 9, 1996

(86) PCT No.: PCT/EP96/03531

§ 371 (c)(1),
(2), (4) Date: Mar. 27, 1998

(87) PCT Pub. No.: WO97/12746

PCT Pub. Date: Apr. 10, 1997

(30) Foreign Application Priority Data
Sep. 29, 1995 (DE) .......................... 195 36 289

(51) Int. Cl.
*B29C 47/40* (2006.01)
*B29C 45/76* (2006.01)

(52) U.S. Cl. ......................... 366/83; 366/100
(58) Field of Classification Search ............. None
See application file for complete search history.

(56) References Cited

U.S. PATENT DOCUMENTS 4,550,002 A  10/1985  Uhland et al.

FOREIGN PATENT DOCUMENTS

| DE | 33 48 324 | 11/1993 |
| WO | WO 93/07769 | 4/1993 |

OTHER PUBLICATIONS

Decision of the Technical Board of Appeal 3.2.5 dated Jan. 20, 2004 including English translation.
"Protokoll uber die offentliche mundliche Verhandlung . . . " including translation (no publication date).
Kunststoffe 75 (1985) "Kunststoffe—ein Werkstoff macht Karriere"; Dipl.–Ing. Heinz Herrmann, "Aufbereitung des Kunststoffe–Rohstoffs" pp. V to XVI: Carl Hansr Verlag, Munchen 1985.
Kunststofftechnik "Der Doppelschneckenextruder: Grundlagen—und Anwendungsgebiete", 4., revised edition, VDI Verlag GmbH, Dusseldorf 1998; pp. 242 to 255 and 573 to 590.
Thesis, presented on May 17, 1990, at Ecole Nationale Superieure Des Mines De Paris by Claire Barres; "transformation de prouits cerealiers par cuisson extrusion—approche experimentale et modelisation", list of contents as well as pp. 49 to 59, 97 to 113, 217 and 218.

(Continued)

Primary Examiner—Kiley S. Stoner (57) ABSTRACT

In a method of carrying out continuous preparation processes on tightly meshing extruders rotating in the same sense such as twin-screw and multi-shaft screw-type extruders, the extruder is operated at a screw speed of rotation of at least 800 rpm, accompanied with a simultaneous increase of the so-called "torque density" ($M_d/a^3$) of at least 11 Nm/cm$^3$ and a volumetric ratio (Da/Di) of at least 1.5.

OTHER PUBLICATIONS

World Compounding Congress, AMI's International Conference for the Thermoplastic Compounding Industry, Swissotel Rheinpark, Neuss, Germany, Feb. 10 and 11, 1993, "Design optimisation of the co–rotating twin screw extruder", J. A.Colbert, M.J. Dillon Feb. 16, 1993.
Table P2 with diagram as Annex P2 by Appellant on Aug. 17, 2001 (no publication date).
"Oer Ooppelschneckenextruder–Grundlagen und Anwendungsgebiete", VOI–Gesellschaft K:unststotftechnik, Apr. 1994, (insbes. Seiten 153–220, 242–254, 573–590).
"Der Doppelschneckenextruder–Grundlag'9n und Anwendungsgebiete", VDI–Gesellschaft K:unststofftecknik, Feb. 1995.
Chris Rauwendaal: "Polymer Extrusion", Hanser Publishers 1986 (Insbes. Seiten 148,470).
Veroffentlichung "Kunststoffe 78 (1998);(Insbes. Seiten 876–884) H.Herrmann:"Auf dem Weg zur flexiblen und intelligenten Aufbereitungsanlage.
Compounding '95 Conference, Aug. 1995; Volrag von Marlin Hack: "Evaluating Extrusion Models for Scale–up Twin Screw Compounding Process".
Handbuch der Kunststoff–Extrusionstechnik, Band II Extrusionsanlagen, OVI: (3) Carl Hanser Verlag, MOnchen, Wien 1986, (handwritten date).
"Styrenics Retec", Feb. 1995; Vortrag von Thiele u.a.: "Integrating Compounding and Reacting with Finishe,d Products Extrussion".
Unterlagen zur Offenkundige Vorbenutzung, (1983) (handwritten date).
Veroffentlichung "Kunststoffberater"; Oct. 1992 (Insbes. Seiten 34–37) Alan Swanborough: "Ooppelschnecken–Comlpoundierextruder mit hohem spezifischen Orehmoment".
AuszOge aus Firmenprospekte, (no publication date).
"Japan Plastics", Band 9, Nr. 1, Jan. 1975, Seiten 18–25, Aufsatz von Fumio Aida: "Investigating of Ultra–High ~3peed Extruder based on entirely new Design Concept".
SPE Antec 1992, Detroit, USA (Seite 2530).
Chemical Engineering Congress, Aug. 1992, (Seite 74).
Extrusion Communique, Oct.–Dec. 1990 (Seite 11).
Polymer Engineering and Science, Sep. 1978, Vo.18, No. 12 M.L. Booy: "Geometry of Fully Wiped Twin–Screw Equipment".
Extrusion Communique, Dec. 93.
Berstorrf K–95 Exhibit, Pressemitteilung der Berstorff Corporation yom Jul. 26, 1996 zur K'95.
Newly Developed ZE Twinscrew Extruder,Pressemitteilung der Firma Berstorff vom 5.10.1995 zur K'95 (nachveroffentlicht).
AMI World Compounding Congress, Mar. 1997 (nachveroffentlicht), (handwritten date).
Diverse Messeberichte zur K'95 Ober Berstorff Doppelschnecken—extruder (teilweise nachveroffentlicht).
Katalog der Fa. Clextral (undatiert), (no publication date).
White, J.L.: "Mixing and compounding of polymers",Manas–Zloczower p. 332 (1994) (verspatet eingereicht).
Kruder, G.A., Plastics Engineering, Apr. 1979 (p. 29) (verspatet eingereicht).
Zweiteiliger Schneckenkneter ZSK, Wissenwertes uber Entwicklung und Verfahrenstechnik (verspatet eingereicht), (Sep. 1992) (handwritten date).
Conference: Continuous Compounding in the 90's, Nov. 30, 1993 until Dec.12,1993, Vortag von D. Mielcarek: Technology advances in twin screw compound lines (verspatet eingereicht).
H. Meijer at al: The Modelling of Continuous Mixers Part I: The co–rortating Twin–Screw Extruder, Polymer Engineering and Science, mid–March, vol. 28, No. 5 (verspatet eingereicht).
H.Potente et al., "Design of Tightly Intermeshing Co–rotating Twin Screw OV: 030 Extruders", Intern. Polymer Processing IX (1994) (verspatet eingereicht).
Technische dokumentation betreffend Krupp Werner und Pfleiderer (verspatet eingereicht und nachveroffentlicht), (1998) (handwritten date).
Journal of Food Engineering 12 (1990), Seiten 293–306, F.Hsieh et ai, "Studies of Whole Cottonsed Processing with a Twin–Screw Extruder" (verspatet eingereicht).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claim 1 is determined to be patentable as amended.

Claims 3–8, dependent on an amended claim, are determined to be patentable.

New claims 9–15 are added and determined to be patented.

1. A method of carrying out a continuous process of preparation of plastic material on an extruder, comprising
    a housing,
    at least two cylindrical housing bores, each housing bore having an axis, said axes being disposed parallel to each other, said housing bores intersecting each other and having a first end and a second end,
    an inlet hopper being provided in the vicinity of said housing bores and opening into said housing bores,
    a die head being disposed at said second end of said housing bores,
    at least a first screw shaft and a second screw shaft being disposed in said at least first and second housing bores,
    said at least first and second screw shaft being provided with a first screw and a second screw, respectively, each screw defining a screw root, said first screw and said second screw root tightly intermeshing and said second screw and said first screw root tightly intermeshing,
    said first and said second screw each having a screw outer diameter $D_a$ and a screw inner diameter $D_i$, said screw diameters being identical,
    said at least first and second screw shaft each having a volumetric ratio of at least 1.5, wherein the volumetric ratio is defined by the screw outer diameter $D_a$ divided by the screw inner diameter $D_i$, and
    said first and said second axis having a distance a of axes,
    a drive connectable to said at least first and second screw shaft to drive said at least first and second screw shaft in a same direction of rotation at a screw speed of rotation $n_s$ and at a shaft torque $M_d$,
    wherein the method comprises the following steps:
        feeding plastic material to be processed through the inlet hopper into said housing bores,
        conveying said plastic material through said screw roots from said inlet hopper to said outlet,
        driving each of said at least first and said second screw shaft at a screw speed of rotation $n_s$ of at least [600] *800* rpm, at a torque density $M_{d/a}{}^3$ of at least 11 Nm/cm$^3$,
        wherein the torque density is defined by the shaft torque Ma [Nm] at each first and second shaft divided by the third power of the distance a of the first and second axes of the first and second screw shaft.

*9. A method according to claim 3 wherein the said first and second screw 3 shaft are driven at a torque density $M_{d/a3}$ of 11–15 Nm/cm$^3$.*

*10. A method according to claim 9 wherein the plastic material is conveyed through said housing bores from said inlet hopper to said outlet at a mean product dwell time of less than 10 seconds.*

*11. A method according to claim 10 wherein the plastic material is conveyed through said housing bores from said inlet hopper to said outlet at a mean product dwell time of less than 2 seconds.*

*12. A method according to claim 9 wherein the twin-feed extruder has a volumetric ratio of at least 1.55.*

*13. A method according to claim 8 wherein the said first and second screw shaft are driven at a torque density $M_{d/a3}$ of 11–15 Nm/cm$^3$.*

*14. A method according to claim 13 wherein the plastic material is conveyed through said housing bores from said inlet hopper to said outlet at a mean product dwell time of less than 10 seconds.*

*15. A method according to claim 3 wherein the plastic material is conveyed through said housing bores from said inlet hopper to said outlet at a mean product dwell time of less than 2 seconds.*

\* \* \* \* \*